United States Patent [19]

Wesselski

[11] Patent Number: 5,423,400
[45] Date of Patent: Jun. 13, 1995

[54] MECHANICAL ENERGY ABSORBER

[75] Inventor: Clarence J. Wesselski, Alvin, Tex.

[73] Assignee: The United States of America as represented by the Administrator of the National Aeronautics & Space Administration, Washington, D.C.

[21] Appl. No.: 98,911

[22] Filed: Jul. 29, 1993

[51] Int. Cl.⁶ .................... B65H 59/10; F16F 1/20
[52] U.S. Cl. .......................... 188/67; 267/162; 188/300
[58] Field of Search ............... 188/67, 300; 267/64.26, 267/161, 162, 163, 169, 249, 158, 196, 214, 134

[56] References Cited

U.S. PATENT DOCUMENTS

| | | | |
|---|---|---|---|
| 2,264,902 | 12/1941 | Hill | 267/162 X |
| 2,707,108 | 4/1955 | Schottler | 279/54 |
| 3,176,590 | 4/1965 | Uhtenwoldt | 91/45 |
| 3,375,000 | 3/1968 | Seamands et al. | 267/162 |
| 3,828,893 | 8/1974 | Clark | 188/67 |
| 3,843,159 | 10/1974 | Hood, II | 280/407 |
| 3,986,583 | 10/1976 | Kinzbach | 188/67 |
| 4,007,815 | 2/1977 | Acre | 188/265 |
| 4,191,503 | 3/1980 | Neff et al. | 414/401 |
| 4,877,226 | 10/1989 | Taylor | 267/64.26 X |
| 5,131,115 | 7/1992 | Sarto | 16/82 |

FOREIGN PATENT DOCUMENTS 1903993  8/1970  Germany ............... 267/134

Primary Examiner—Robert J. Oberleitner
Assistant Examiner—Kevin D. Rutherford
Attorney, Agent, or Firm—James M. Cate; Edward K. Fein; Guy M. Miller

[57] ABSTRACT

An energy absorbing system for controlling the force where a moving object engages a stationary stop and where the system utilized telescopic tubular members, energy absorbing diaphragm elements, force regulating disc springs, and a return spring to return the telescoping member to its start position after stroking. The energy absorbing system has frusto-conical diaphragm elements frictionally engaging the shaft and are opposed by a force regulating set of disc springs. In principle, this force feedback mechanism serves to keep the stroking load at a reasonable level even if the friction coefficient increases greatly. This force feedback device also services desensitize the singular and combined effects of manufacturing tolerances, sliding surface wear, temperature changes, dynamic effects, and lubricity.

20 Claims, 3 Drawing Sheets

MECHANICAL ENERGY ABSORBER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

FIELD OF THE INVENTION

This invention relates to an energy absorbing mechanism and more particularly, to an energy absorbing mechanism for providing a controlled feedback force relationship in response to a shock impact which occurs when a moving object is suddenly stopped so that the load on the system is within acceptable load limits.

BACKGROUND OF THE INVENTION

Energy absorbing mechanisms typically are either mechanical or hydraulic and sometimes a combination of hydraulic and mechanical systems. This invention concerns itself with mechanical energy absorbing means. Mechanical energy absorbing means typically utilize a basic spring mechanism and some sort of friction system to dampen or absorb the force effects caused by the spring. As a general rule, the mechanisms for controlling the spring rate are bulky or large and do not provide an effective control of shock forces in any simple manner. Nearly all of the existing mechanical energy absorbing systems have one or more of the following disadvantages:
- —require close manufacturing tolerances;
- —are sensitive to extreme temperature changes;
- —mechanical types are sensitive to changes in the friction coefficient;
- —production of a sharp load spike at the beginning of a stroke due to the initial breakaway friction coefficient;

Fluidic energy absorbing systems also include disadvantages of:
- —sensitivity to stroking velocity;
- —fluidic types are subject to leaks;

In addition, material deformation types of energy absorbers are limited to one-cycle or one time operations.

PRIOR ART PATENTS

U.S. Pat. No. 3,828,893 (class 188/87) issued to T. R. Clark on Aug. 13, 1974 relates to a linking device in a mechanism to adjust to a "fixed" position until released to move to another "fixed" position. The linking device employs sets of flat washers which are canted and located between a shaft and a housing and can be manipulated to seize and release the shaft as necessary.

U.S. Pat. No. 3,176,590 (class 91/45) issued to H. R. Ubtenwoldt, et al, on Apr. 6, 1965 relates a clamping device formed from a notched conically shaped discs which are utilized to lock a shaft in place.

U.S. Pat. No. 2,707,108 (class 279/54) issued to H. Schottler on Apr. 26, 1955 relates to a rotational coupling device which utilizes a conically shaped disc which has radially extruding slits extending to stress relief openings. When assembled on a shaft, the discs can be compressed to frictionally engage and grip a shaft for rotational purposes.

U.S. Pat. No. 5,131,115 (class 16/82) issued to J. A. Sarto on Jul. 21, 1992 relates to a positioning device where a shaft passes through elliptically shaped discs which are contained within a housing by opposing compression springs. An actuation can release the locking function of the discs to permit movement.

U.S. Pat. No. 3,986,583 (Class 188/67) issued on Oct. 19, 1976 to R. B. Kinzbach relates to use of springs and coupling devices.

U.S. Pat. No. 4,007,815 (class 188/265) issued on Feb. 15, 1977 to L. R. Acre relates to a locking device which utilizes a hydraulic system with a locking pawl and a spring.

U.S. Pat. No. 3,843,159 (class 280/407) issued on Oct. 22, 1974 to C. N. Hood relates to a latching device for a shaft which utilizes lock washers which can be locked and unlocked with respect to the shaft.

U.S. Pat. No. 4,191,503 (class 414/401) issued on Mar. 4, 1980 to R. O. Neff, et al, relates to a locking device which utilizes friction plates with holes where the friction plates when filled provide a locking function.

THE PRESENT INVENTION

The present invention is embodied in an energy absorbing means which has a tubular housing member slidably receiving a telescoping tubular shaft member where an internal spring is disposed between an internal end surface of the housing member and an internal end surface of the telescoping shaft member to resiliently bias the members to an extended condition. Because a spring alone can develop high load forces and will oscillate, it is desirable to have a primary energy absorbing means which dampens the oscillation effect and reduces the load forces. More importantly, in some instances it is desirable to regulate the load forces upon the object when the object is brought to a sudden stop so that impact forces on the moving object are controlled within a tolerable range.

Upon a load impact, the main spring of the mechanism is compressed with the movement of the housing member and telescoping shaft member toward a contracted condition. The movement occurs when one of the members is attached to a moving object and the other member contacts an immovable wall or barrier.

The telescoping shaft member has an outer hardened frictional surface which extends through a friction mechanism which provides a primary force controlling mechanism. The primary force controlling mechanism includes a plurality of frusto-conical, thin wall, diaphragm members constructed from a resilient material which are received in a tubular housing portion of a housing member. The bores of the diaphragm members are sized to frictionally engage the outer frictional surface of the shaft. The frusto-conical diaphragm members, in an initial or first directional position, provide a mechanical frictional resistance when the outer frictional surface moves relative to the housing member toward a contracted condition. The friction resistance causes the frusto-conical diaphragm members to be resiliently compressed radially or deflected during travel of the outer frictional surface relative to the housing member. This produces an increasing friction load on the shaft member until the diaphragm members are deflected from a frusto conical configuration to a position normal to the axis of the shaft member. As this relative movement progresses, the inner base of the frusto-conical diaphragm members engage a disc spring member(s) which provide an opposing resilient spring force on the diaphragm members to maintain the frictional load on the shaft member. If the relative motion continues, the diaphragm members pass through the position normal to the axis of the shaft member into a reversed position. In this displacement process, the forces exerted by the disc spring members are increasing but the friction force between the shaft and diaphragm members also increase. When the impacting force reaches an equilibrium or balance of load with the resisting spring forces, the diaphragm members continue to maintain a frictional load on the shaft member to absorb energy forces.

DESCRIPTION OF THE INVENTION

Figure 1:
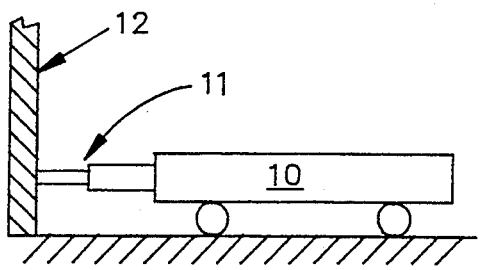
FIG. 1 is a schematic illustration of a movable vehicle with an attached energy absorbing means to illustrate the application of the energy absorber.

Referring now to the drawings, in FIG. 1 a vehicle or mobile conveyance 10 has an attached energy absorbing means 11 where the energy absorbing means 11 is adapted to engage a stop 12 and is intended to cushion and absorb the forces involved in a sudden or abrupt impact with the stop.

Figure 2:
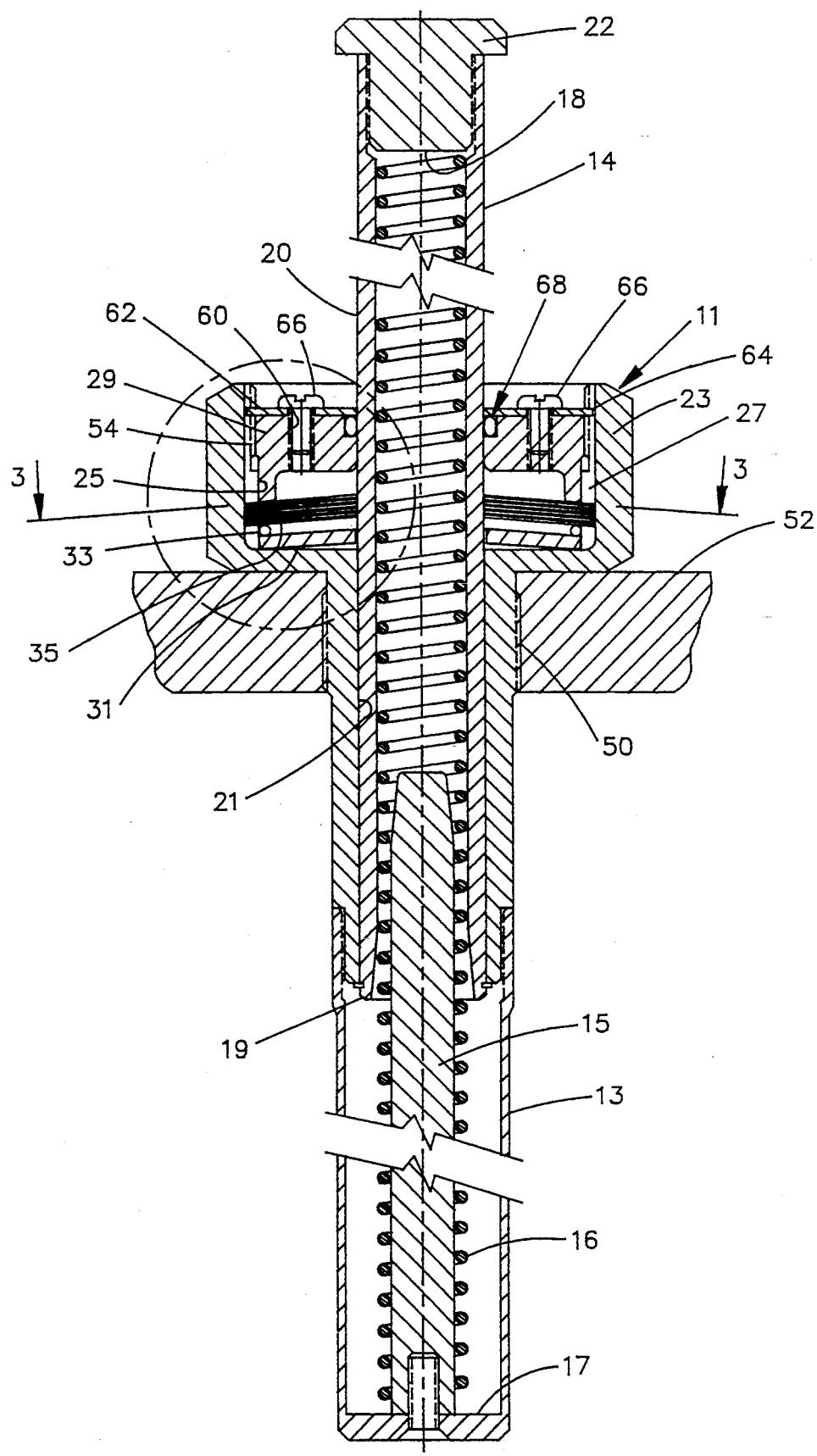
FIG. 2 is a view in longitudinal cross-section through an energy absorbing means embodying the present invention.

The energy absorbing means 11, as shown in FIG. 2, includes telescoping tubular members 13, 14 which are illustrated in an extended position. One of the tubular members 13 (sometimes called a housing member) has an internal and centrally located guide bar 15 which provides a central support for a helical spring 16 where the spring 16 is located between internal end surfaces 17, 18. The spring 16 serves to extend the tubular members 13, 14 to an extended condition relative to one another.

The other tubular member 14 (sometimes called a telescoping shaft member) has a outer surface 20 which is slidingly received in a bore 21 of the housing member 13. A stop shoulder or ring 19 is provided on the end of the shaft member 14 to limit relative extended travel of the members. At the other end of the shaft member 14 is an end cap 22 for engaging a stop. The spring 16 between the members 13 and 14 is shown in an extended position and is capable of being compressed when the members are moved toward a contracted position. These members are moved toward a contracted position in response to an impact force on the end cap 22 to provide a regular spring rate relationship in an energy absorbing fashion.

The housing member 13 has an enlarged hollow housing portion 23 located about the outer surface 20. The bore 25 of the housing portion 23 has three (3) lengthwise extending grooves 27 (see FIG. 3) located at 120° relative to one another about a central axis. As shown in FIG. 2, the upper end of the bore 25 is threaded to receive a retainer cap 29. In the bottom of the housing portion 23 is a metal belleville spring washer member 31. The inner bore of the washer member 31 has a slight annular clearance with respect to the outer surface 20 and the outer surface of the washer member has an annular clearance with respect to the bore 25. An annular metal spacer ring member 33 is located at the outer periphery of the washer member 31. Disposed on the spacer ring 33 in the housing portion 23 are a nested series of frusto-conically shaped, thin wall, resilient, friction diaphragm members 35. The diaphragm members 35 have an initial frusto-conical configuration where the frusto-conical surfaces are inclined toward the end cap 22 on the assembly.

The resilient diaphragm members 35 each have cylindrically formed tab portions 37 (see FIG. 3) located at an angle of 120° from one another about a central axis where each tab portion 37 has a projection 39 which is slidably received in a groove 27. Each tab portion 37 is connected to an adjacent tab portion by an elongated tension portion 41. The members 35 are die cut to form the tension portions 41 and to form inwardly extending friction elements 43. Thus, there are three (3) friction elements 43 in each diaphragm member which extend radially between a tab portion 37 and a semi-circular friction surface 45. The inner bore diameter of the semi-circular friction surface is sized smaller by several thousands of an inch than the O.D. of the shaft surface 20 so as to frictionally engage the outer shaft surface 20.

Figure 3:
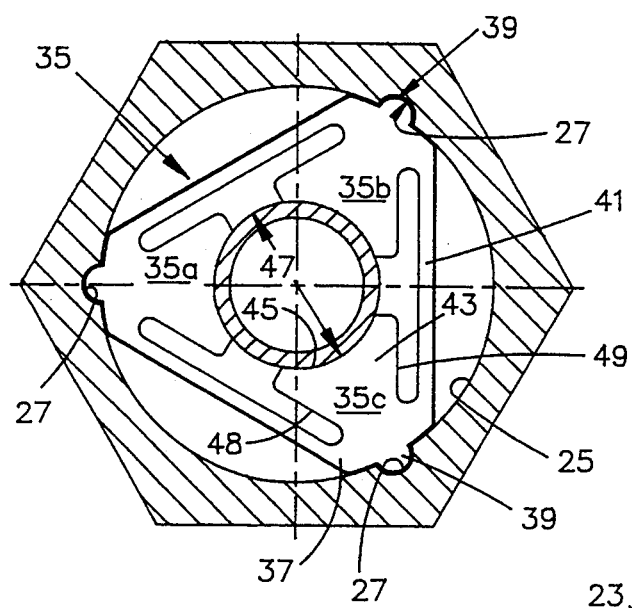
FIG. 3 is a plan view of the configuration of a frusto-conical spring means of the present invention taken along line 3—3 of FIG. 2.

The outer edge surfaces of the tab portions 37 are spaced inwardly from inner bore 25 of the housing portion 23 to permit expansion (See FIG. 3). As shown in FIG. 3, the configuration of a diaphragm member 35 thus includes three circumferentially spaced, segmental beam elements 35a, 35b and 35c each of which respectively have an inner curved surface 45 which lies on a bore diameter 47 for the semi-circular friction surfaces 45 of the beam elements. As noted, the bore diameter 47 has a significantly lesser diameter than the outer diameter of the outer surface 20. Each segmental element 35a, 35b and 35c has a major base portion with tapered side edges 48, 49 extending to a narrow connection with an outer connecting tension portion 41. The diaphragm members 35 are made of material such as stainless steel, spring resistant material.

The housing member 23 has an outer threaded portion 50 for attachment to a wall 52 of a moving vehicle. The housing portion 23 engages the wall 52.

The friction diaphragm members 35 are held in place by the retainer cap 29. The retainer cap 29 has an exterior threaded section 54 which provides for threaded attachment. The retainer cap 29 has an annular, inner flange which is adapted to contact the outer tab portions 37. When the retainer cap 29 is snugly in place, it is finally adjusted to align threaded bores 60 in the retainer cap 29 with openings in a retainer washer 62. The retainer washer 62 is sized to be received in the housing portion 23 and fits loosely on the shaft 14 but has alignment projections 64 which are slidably received by the grooves 27. Thus, cap screws 66 can attach the retainer washer 62 to the retainer cap 29 and lock the cap 29 in a fixed position. An "O" ring seal 68 can be disposed about the shaft 14 to eliminate debris problems.

As shown in FIG. 3, in the initial condition of the diaphragm members 35, the nested diaphragm members have inner bore surfaces disposed in frictional gripping contact with the outer surface 20 and the outer edge surfaces of the diaphragm members 35 are disposed adjacent, but not touching the inner bore 25 of the housing portion 23. The belleville washer 31 disposed in the housing portion has an annular spacing between the shaft member and the housing portion and an annular spacing with respect to the bore surface of the housing portion. An annular spacer ring 33 is disposed between the base of the spring member 31 and the base of the diaphragm members 35 and separates the sets of members from one another.

The outer surface 20 of the tubular member 14 has a hard surface coating or is made from hardenable material. There can be more than three segments or tabs in a diaphragm member 35. With three tabs, the radial length of the beams can be quite long thus permitting a much larger radial displacement without overstressing the material. A larger displacement permits greater manufacturing tolerances.

Figure 4:
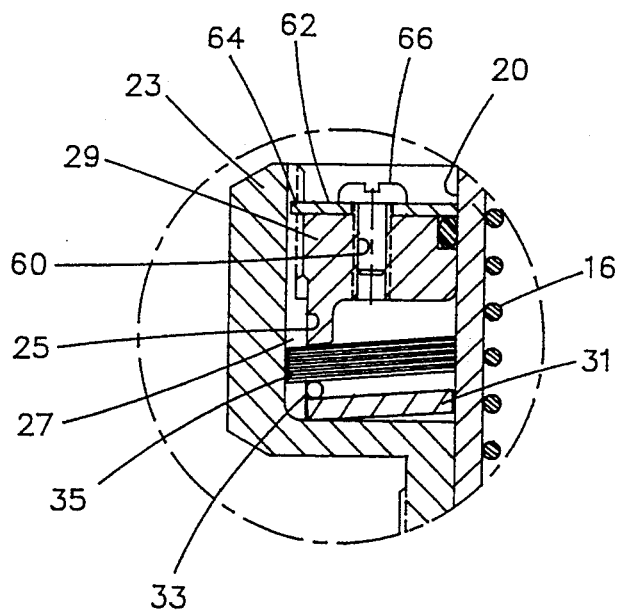
FIG. 4 is a view in an enlarged cross-section of the frusto-conical spring means in a static condition.
Figure 5:
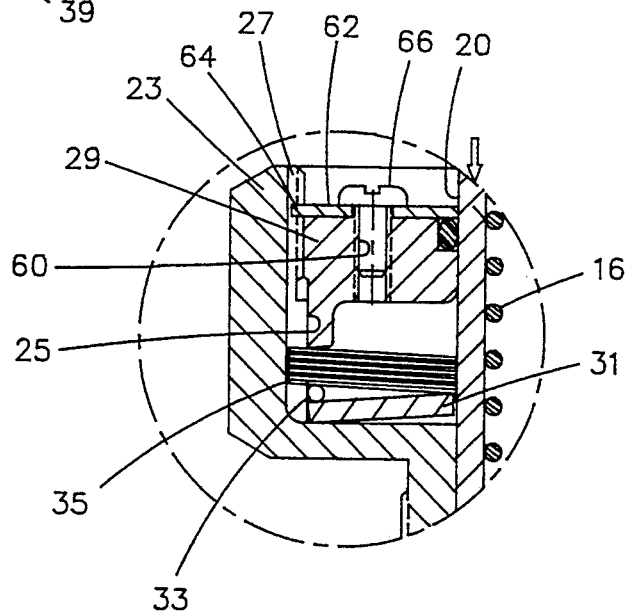
FIG. 5 is a view in enlarged cross-section of the frusto-conical spring means during a stroking motion.

In operation, when the device is assembled as shown in FIG. 2 and attached to a vehicle as shown in FIG. 1, engagement of the impact end cap 22 of the assembly will cause the member 14 to telescope into member 13 from the extended position toward a contracted position. The diaphragm members 35 are in frictional engagement with the outer surface 20. The frictional engagement cause the diaphragm members 35 to move radially or straighten out and "squeeze" the tubular shaft member 14 with increasing force as the shaft member is stroked relative to the housing. This movement or displacement results in the compression of the beam elements 35a, 35b, 35c and elongation of the tension elements 41. The diaphragm members 35 absorb energy of the movement of the shaft member 14 and the load of the diaphragm members on the shaft member increases which increases the friction force. Ultimately, the increase of the friction force causes the diaphragm members 35 to pass from their initial configuration (see FIG. 4) to a position which is approximately normal relative to the axis of the shaft member 14. Thereafter, the belleville spring element 31 engages the diaphragm members 35 and provide a resisting spring force on the diaphragm members 35 which maintains the frictional load on the shaft and continues to absorb the energy load (see FIG. 5). If a lubricant such as Braycote 815Z oil is applied to the shaft surface 20, the wear factor is reduced and the unit has excellent recycling characteristics.

Figure 6:
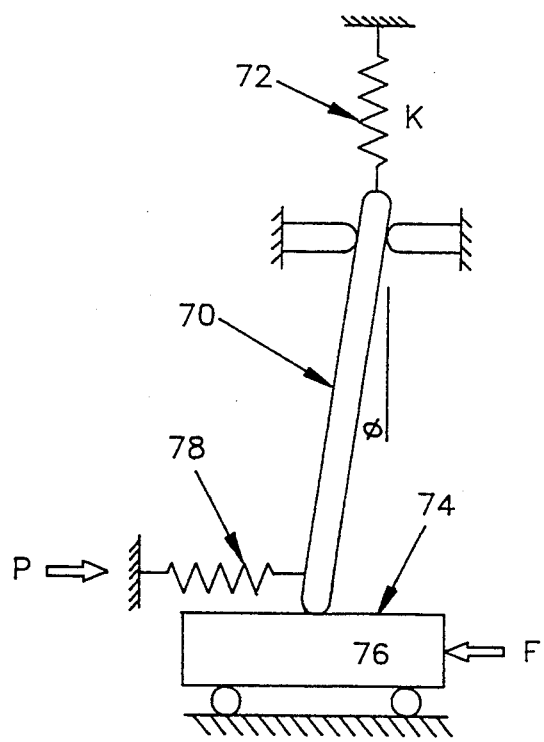
FIG. 6 is a schematic illustration of the force relationships with the force control system of the present invention.

To aid in an understanding of the principles of this device, in FIG. 6, the diaphragm members 35 can be schematically represented by a slanted rod 70 which is forced downwardly by a spring 72 onto a surface 74 on a moving member 76. The load on the surface 74 is a function of the element angle $\phi$ of the rod 70 and the spring force K of the diaphragm members. As the rod 70 is moved past a perpendicular to the surface 74, the rod is acted on by the regulating spring 78. The output load P is a function of the spring rates of spring 72,28 as well as the slant angle and the friction coefficient $\mu$.

Figure 7:
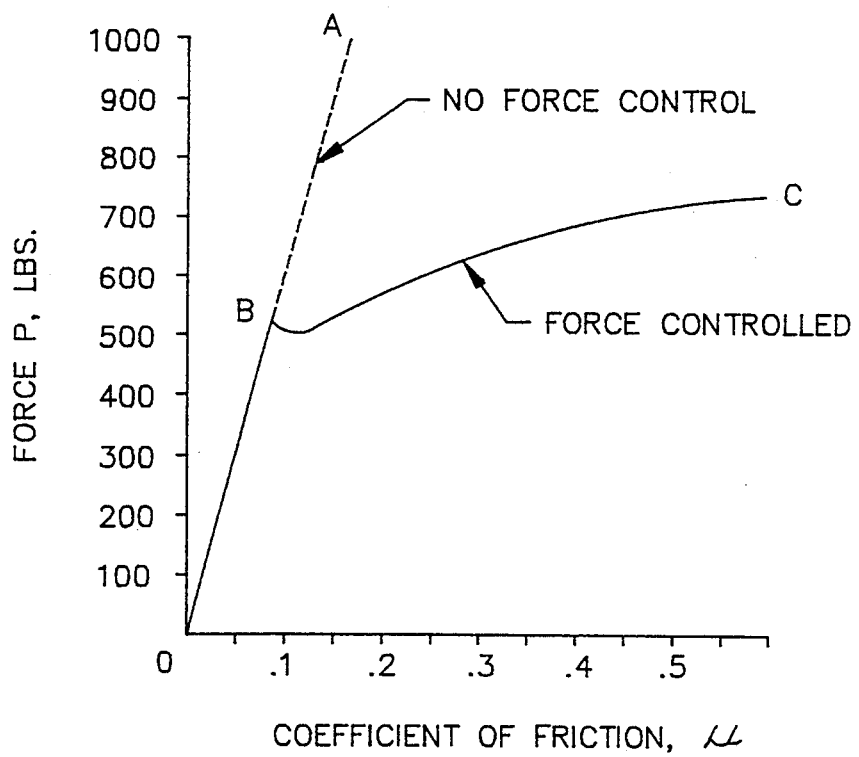
FIG. 7 is a graph of force vs. the coefficient of friction.

As shown in FIG. 7, where there is no force control, the load output P is directly proportional to the friction coefficient as indicated by the curve O-A. With force regulation, the diaphragm member and belleville springs control the load level as shown by the curve B-C.

This invention represents the inherent simplicity of a mechanical energy dissipator yet has simple innovative features which regulates the dissipator load to a tolerable limit under adverse environments or varying manufacturing variables. Specific advantages are as follows:

1. It does not leak fluid as the fluidic type does;
2. It will operate repeatedly for many load application cycles;
3. It is not sensitive to velocity and it will not give excessive initial stroking loads as the fluidic type does;
4. It minimizes environmental effects:
   a. of temperature extremes and
   b. of vacuum.
5. Minimizes the effect of manufacturing variables of:
   a. surface finishes;
   b. machining tolerances;
   c. surface hardness; and
   d. lubricity.
6. It will compensate for wear up to a reasonable limit.

It will be apparent to those skilled in the art that various changes may be made in the invention without departing from the spirit and scope thereof and therefore the invention is not limited by that which is disclosed in the drawings and specifications but only as indicated in the appended claims.

I claim:

1. A force absorbing device for controlling the impact load when a moving object is brought to a sudden stop, said device comprising:

tubular telescopic-members respectively have an attaching portion for coupling to a moving object and an impact end portion for engaging a stationary stop;

one of said members having a housing portion defining an annular recess about the outer surface of said other member;

energy absorbing means disposed in said annular recess and including nested frusto-conical diaphragm members disposed in frictional contact with said outer surface, said frusto conical diaphragm members being constructed and arranged for resilient radial movement in response to frictional engagement with said outer surface upon relative movement of said members, said frusto conical diaphragm members being normally inclined toward the engagement end of said tubular member in an extended condition of said members;

said frusto conical diaphragm members being radially movable to the extent necessary to permit said frusto conical diaphragm members to reverse their inclination toward the attachment end of said tubular member; and disc spring means disposed in said annular recess between said one member and said frusto-conical diaphragm members and having an inclination toward said attachment end so that a resilient spring force is provided in response to engagement of said disc spring means with said frusto-conical diaphragm members for controlling the load applied to the device.

2. The force absorbing device as set forth in claim 1 wherein said diaphragm members also have an outer triangular configuration with angularly located projections at apex portions of the triangular configuration, said housing porting having lengthwise extending grooves for slidably receiving said projections and thereby prevent relative rotation.

3. The force absorbing device as set forth in claim 2 and further including a retainer cap member for engaging the apex portions of the triangular configuration.

4. The force absorbing device as set forth in claim 3 where said retainer cap member is threadedly received in said housing portion and further including a retainer ring member having angularly located projections for registry with said longitudinally extruding grooves, and means for attaching said retainer ring member to said retainer cap member.

5. The force absorbing device as set forth in claim 1 and including a spacer member disposed between the outer edge surfaces of said diaphragm members and said disc spring means.

6. The force absorbing device as set forth in claim 4 and including a retainer cap member for engaging said diaphragm members in said housing portion.

7. The force absorbing device as set forth in claim 1 wherein said diaphragm members are constructed with at least three segmental tab elements where said tab elements have an inner base portion in contact with said outer surface and a narrow outer portion connecting with an outer tension portion.

8. The force absorbing device as set forth in claim 1 and further including spring means deposed between internal end surfaces of said tubular members for extending said tubular members to an extended condition.

9. The force absorbing device as set forth in claim 1 and further including a lubricant on said outer surface.

10. A force absorbing device for controlling the impact load when a moving object is brought to a sudden stop, said device comprising:
tubular telescopic members respectively have an attaching portion for coupling to a moving object and an impact end portion for engaging a stationary stop;
spring means disposed between internal end surfaces of said tubular members for extending said telescopic members to an extended condition, said spring means being compressible in response to an impact reaction force on the impact end portion engaging a stationary stop;
one of said members having a housing portion defining an annular recess about an outer surface of said other member;
energy absorbing means disposed in said annular recess and including nested frusto-conical diaphragm members disposed in frictional contact with said outer surface, said frusto conical diaphragm members being constructed from resilient material and having segmental members in the frictional contact with the outer surface where said segmental members are capable of resilient radial movement in response to the frictional contact with said outer surface upon relative movement of said members, said frusto conical diaphragm members being normally inclined toward the engagement end of said tubular member in an extended condition of said members;
at least one disc spring member disposed in said annular recess between said one member and said frusto-conical diaphragm members and having an inclination toward said attachment end so that a resilient spring force is provided in response to engagement of said disc spring member with said frusto-conical diaphragm members for controlling the load applied to the device.

11. The force absorbing device as set forth in claim 10 and including a spacer member disposed between the outer edge surfaces of said diaphragm members and said disc spring member.

12. A force absorbing mechanism for absorbing a force load, said mechanism including tubular housing and a tubular shaft slidably received in said tubular housing for limited travel between an extended position and a contracted condition,
spring means for engaging said housing and said tubular shaft for moving said housing and said shaft to an extended position;
a stacked array of frusto-conically shaped spring diaphragm elements disposed in frictional engagement with the tubular shaft for resisting relative motion of the shaft from the extended position to the contracted condition;
said spring diaphragm elements being contained within said housing; and
belleville spring means disposed within said housing and separated by a spacer element from said spring diaphragm elements whereby said diaphragm elements can engage said belleville spring means for absorbing the force load.

13. The force absorbing mechanism as set forth in claim 12 and including a retainer cap member engaging said diaphragm element in said housing.

14. The force absorbing device as set forth in claim 13 wherein said diaphragm elements also have an outer triangular configuration with angularly located projections at apex portions of the triangular configuration, said housing having lengthwise extending grooves for slidably receiving said projections and thereby prevent relative rotation.

15. The force absorbing device as set forth in claim 14 and further including a retainer cap member for engaging the apex portions of the triangular configuration.

16. The force absorbing device as set forth in claim 15 where said retainer cap member is threadily received in said housing and further including a retainer ring member having angularly located projections for registry with said longitudinally extending grooves, and means for attaching said retainer ring member to said retainer cap member.

17. A method of controlling the force load generated when a moving object is decelerated by engagement with a structure, comprising the steps:
absorbing the kinetic load energy of a moving object by compressing a spring means disposed within a telescoping and relatively moveable tubular housing and tubular shaft wherein one of the shaft and housing is attached to the object and the other of the shaft and housing is engagable with the structure;
during the relative movement of the housing and shaft, applying a frictional retarding force to an outer surface of the moving tubular shaft by means of friction elements extending radially toward the shaft along loci inclined from a plane normal to the shaft; and
increasing the frictional retarding force and the coefficient of friction as a function of travel of said moving tubular shaft relative to said tubular housing by moving the friction elements to respective positions perpendicular to the shaft, to absorb the kinetic load energy.

18. The method as set forth in claim 17 wherein the frictional retarding force is applied with diaphragm members which are displaced by contact with the outer surface of the moving shaft and are radially distorted and with a disc spring member acting in opposition to the displacement of the diaphragm members.

19. A force absorbing device for controlling deceleration shock loads when a moving object is decelerated, the device comprising:

telescopic members respectively having an attaching portion for coupling to a first, moveable object and a second portion for engaging a force resistive structure;

one of said members having a housing portion defining an annular recess about the outer surface of the other telescopic member;

energy absorbing means disposed in said annular recess and comprising means for applying a frictional retarding force to an outer surface of the other member, the energy absorbing means comprising nested diaphragm members disposed in frictional contact with the outer surface, the diaphragm members being constructed and arranged for resilient radial movement in response to frictional engagement with the outer surface upon relative movement of the members, the diaphragm members being inclined toward the second, engagement portion of the associated telescopic member in an extended condition of the associated member;

the diaphragm members being radially movable to the extent necessary to permit the diaphragm members to reverse their inclination toward the attachment portion of the tubular member; and resilient means disposed in the annular recess, adjacent the diagram members, for controlling the inclination of the diaphragm members and thereby controlling the frictional load applied to the outer surface.

20. The force absorbing device of claim 19, further including resilient means for urging the telescopic members to an extended condition.

* * * * *